(12) United States Patent
Paczesny

(10) Patent No.: US 9,949,470 B2
(45) Date of Patent: Apr. 24, 2018

(54) COMBINATION TIP-UP AND JIGGING ROD FOR ICE FISHING

(71) Applicant: Timothy J. Paczesny, Central Lake, MI (US)

(72) Inventor: Timothy J. Paczesny, Central Lake, MI (US)

(*) Notice: Subject to any disclaimer, the term of this patent is extended or adjusted under 35 U.S.C. 154(b) by 84 days.

(21) Appl. No.: 14/714,581

(22) Filed: May 18, 2015

(65) Prior Publication Data

US 2016/0338334 A1 Nov. 24, 2016

(51) Int. Cl.
*A01K 97/12* (2006.01)
*A01K 97/01* (2006.01)
*A01K 97/11* (2006.01)

(52) U.S. Cl.
CPC ............. *A01K 97/12* (2013.01); *A01K 97/01* (2013.01); *A01K 97/11* (2013.01)

(58) Field of Classification Search
CPC ........ A01K 97/12; A01K 97/01; A01K 97/10; A01K 97/11; A01K 97/125; A01K 91/065
USPC ........ 43/19.2, 20, 18.1 R, 18.1 HR, 18.1 CT, 43/17, 16, 21.2
See application file for complete search history.

(56) References Cited

U.S. PATENT DOCUMENTS

| | | | | | |
|---|---|---|---|---|---|
| 2,693,046 | A | * | 11/1954 | Langevin | A01K 97/01 43/17 |
| 2,714,270 | A | * | 8/1955 | Premo | A01K 97/01 43/15 |
| 2,970,400 | A | * | 2/1961 | Nolin | A01K 97/01 43/17 |
| 3,147,563 | A | * | 9/1964 | Molter | A01K 97/01 43/17 |
| 3,530,611 | A | * | 9/1970 | Britt | A01K 89/015 242/309 |
| 3,584,408 | A | * | 6/1971 | Britt | A01K 97/10 43/17 |
| 4,854,069 | A | * | 8/1989 | Smith | A01K 97/10 248/538 |
| 5,279,064 | A | * | 1/1994 | Jaeger | A01K 97/11 43/15 |

(Continued)

FOREIGN PATENT DOCUMENTS

| CA | 2232174 | * | 9/1998 |
|---|---|---|---|
| WO | WO 2004/030449 | * | 4/2004 |

*Primary Examiner* — Peter M Poon
*Assistant Examiner* — Magdalena Topolski
(74) *Attorney, Agent, or Firm* — Northern Michigan Patent Law PLC

(57) ABSTRACT

A combination ice fishing rod useful as a vertical tip-up over an ice fishing hole, a hybrid angled tip-up mode resting on the ice next to the hole, and as a jigging rod. The rod includes a rod tube with an outer end removably holding a conventional rod tip, an enclosed reel housing, and a hollow grip handle aligned with the the rod tube. Three or more folding legs are secured flat against the rod tube, and can be extended radially perpendicular to the rod body to span an ice fishing hole and support the rod vertically over the hole, or at an angle relative to the hole using two legs as a bipod. The grip handle contains an axial signal post selectively latched to the spool in the reel housing, the post released when a fish strikes the line. The rod can be immediately engaged as a reel-operated jigging rod from either the vertical or hybrid tip-up modes.

14 Claims, 9 Drawing Sheets

(56) References Cited

U.S. PATENT DOCUMENTS

| | | | | |
|---|---|---|---|---|
| 8,276,310 | B1* | 10/2012 | Weber | A01K 97/10 43/17 |
| 2002/0174591 | A1* | 11/2002 | Lybarger | A01K 87/00 43/18.1 R |
| 2006/0150469 | A1* | 7/2006 | Allen, Jr. | A01K 97/01 43/17 |
| 2012/0079755 | A1* | 4/2012 | Torres | A01K 97/02 43/17.5 |
| 2013/0318855 | A1* | 12/2013 | Bennis | A01K 91/03 43/17 |
| 2015/0208633 | A1* | 7/2015 | Schramski | A01K 97/125 43/4.5 |
| 2015/0208635 | A1* | 7/2015 | Hondl | A01K 89/015 43/17 |

* cited by examiner

COMBINATION TIP-UP AND JIGGING ROD FOR ICE FISHING

RELATED APPLICATIONS/PRIORITY BENEFIT CLAIM

Not applicable.

FIELD

The subject matter of the present application is in the field of "tip-up" fishing spools and "jigging" rods for ice fishing.

BACKGROUND

Ice fishermen rely primarily on two types of line-and-hook devices for catching fish through holes in the ice: Tip-ups and jigging rods.

A tip-up is a device that rests on the surface of the ice over an ice fishing hole, and provides hands-free support for a spool of line holding a baited hook at depth. The tip-up has an automatic signal flag that trips when a fish strikes, signaling to fishermen near the hole that a fish may be on the line. If the fish has been hooked, the line is usually hauled in hand-over-hand until the fish is landed through the hole in the ice. The main body of the tip-up usually comprises one or more cross-legs that sit flat on the ice, the legs having a span greater than the diameter of the hole to prevent the tip-up from being pulled in.

Jigging rods are typically short, simple fishing rods held over an ice hole by a fisherman, with the line controlled by a simple reel. Fishermen will often use a jigging rod along with one or more tip-ups over multiple holes to increase the chances of success.

It is the present inventor's experience that, while the hands-free nature of a properly set tip-up can be convenient, in practice a jigging rod is more reliable for catching fish, and more fun for reeling them in.

BRIEF SUMMARY

The present invention is a fishing device or "rod" combining functionality of both tip-ups and jigging rods with unique and novel structure. The inventive rod includes a rod-holding tube with a removable rod tip; three or more retractable legs stored flat against the rod tube, the legs independently extendable to radial support positions; a grip handle aligned with the rod tube; a spring-loaded axial signal post or "flag" stored in the handle and movable between retracted (stored) and released (signal) positions; and, a reel housing between the handle and the rod tube, the reel housing having an internal post-latching trigger mechanism.

The independent movement of the retractable legs allows the rod to be used in a classic vertical tip-up mode (with three or more legs forming a flat base on the ice to hold the rod tube vertically over the hole), an angled or "hybrid" tip-up mode (with two adjacent legs forming a bipod to support the end of the rod tube and the reel housing at an acute angle above the ice near the hole), or a jigging rod mode (held by the fisherman, preferably with legs stored flat). When a fish strikes in the vertical or hybrid tip-up modes, tripping the signal post, a fisherman can grab the rod handle and land the fish using the reel like a jigging rod.

The legs may be spring-loaded or otherwise biased toward or secured in their extended radial positions, in order to reduce the possibility of the rod being accidentally dropped through a hole. The end of the rod tube may include a movable collar or cap that locks the stored legs in place against the tube. The cap can be shifted to allow the legs to spring open, or to provide extra clearance for folding iced-up legs back against the tube.

The reel in one form has a fully enclosed housing, and is located at a position on the rod such that when two adjacent legs are extended to form a bipod and the handle is resting on the ice in "hybrid" mode, the reel is elevated above the ice with clearance for the rotatable handle. In a further form, the grip handle includes a foot that raises the signal post off the ice, as well, allowing it to pop open when a fish strikes.

The reel housing is supported above the water in tip-up mode, encloses and protects the fishing line spool against icing up, and may have a handle-mounting plate or cap that can be mounted on either side of the housing to make the reel ambidextrous. In a further form the reel housing is spherical and substantially coaxial with the rod body. In still a further form the reel housing incorporates a manual drag button incorporated into the housing exterior.

The signal post is coaxially arranged within the hollow grip handle, and is selectively engaged with the reel in the retracted position, under a spring bias, using external hash marks on the reel housing to align an internal latch with a catch on the spool. The tip up-post may optionally be lighted. When the spool is rotated by a fish striking the line, the signal post is released.

The removable rod tip is mounted to extend from the end of the rod tube as a longitudinal extension of the rod tube.

Another feature of the combination rod is a hook cleat for temporarily securing hooks and storing loose line outside the reel housing.

Another feature of the combination rod is an internal UV light in the rod tube, at a location where the tube extends into the ice fishing hole at the waterline. The UV light heats the fishing line at the waterline in a flooded chamber portion of the rod tube. This helps prevent the line from freezing into the layer of ice that periodically forms over the surface of water in the hole.

These and other features and advantages of the invention will become apparent from the detailed description below, in light of the accompanying drawings.

DETAILED DESCRIPTION

Figure 1:
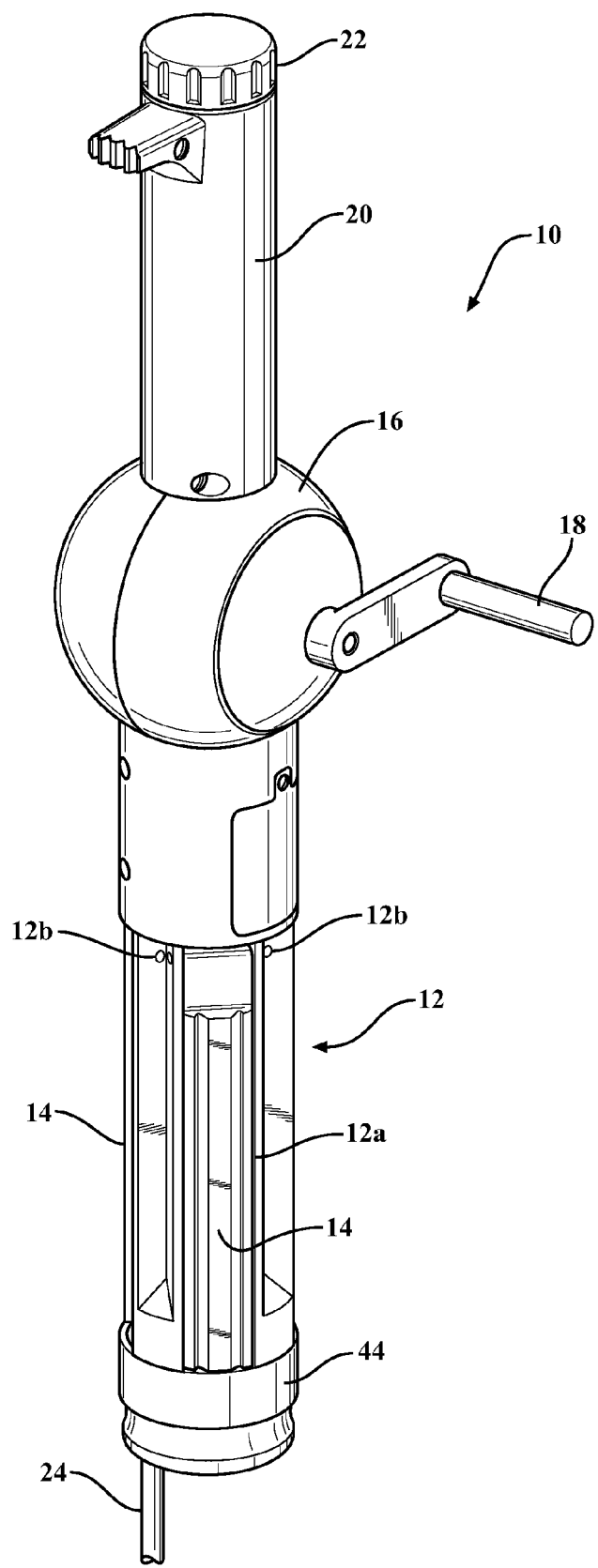
FIG. 1 is a perspective view of a combination ice fishing rod according to the invention.

Referring first to FIGS. 1 through 3A, a combination tip-up and jigging rod 10 is shown in exemplary form in order to teach how to make and use the claimed invention.

Preferred materials for the major components of the rod 10 include various moldable or printable polymers, for example nylon, polypropylene, and/or polycarbonate, with or without fiber reinforcement, that do not become brittle in cold temperatures. Other materials may be used as well, including but not limited to wood and metal for various components, and will be apparent to those skilled in the art.

Rod 10 includes a front end rod tube 12 with retractable legs 14, a reel housing 16 with a rotatable handle 18, a handle or grip 20 generally coaxial or aligned with tube 12, a signal flag or post 22, and a rod tip 24 removably connected to the end of tube 12. The grip 20, signal post 22, rod tube 12, and rod tip 24 are all generally aligned with their respective longitudinal axes generally parallel, so that rod 10 as a whole handles like a fishing rod when used for jigging.

Figure 2:
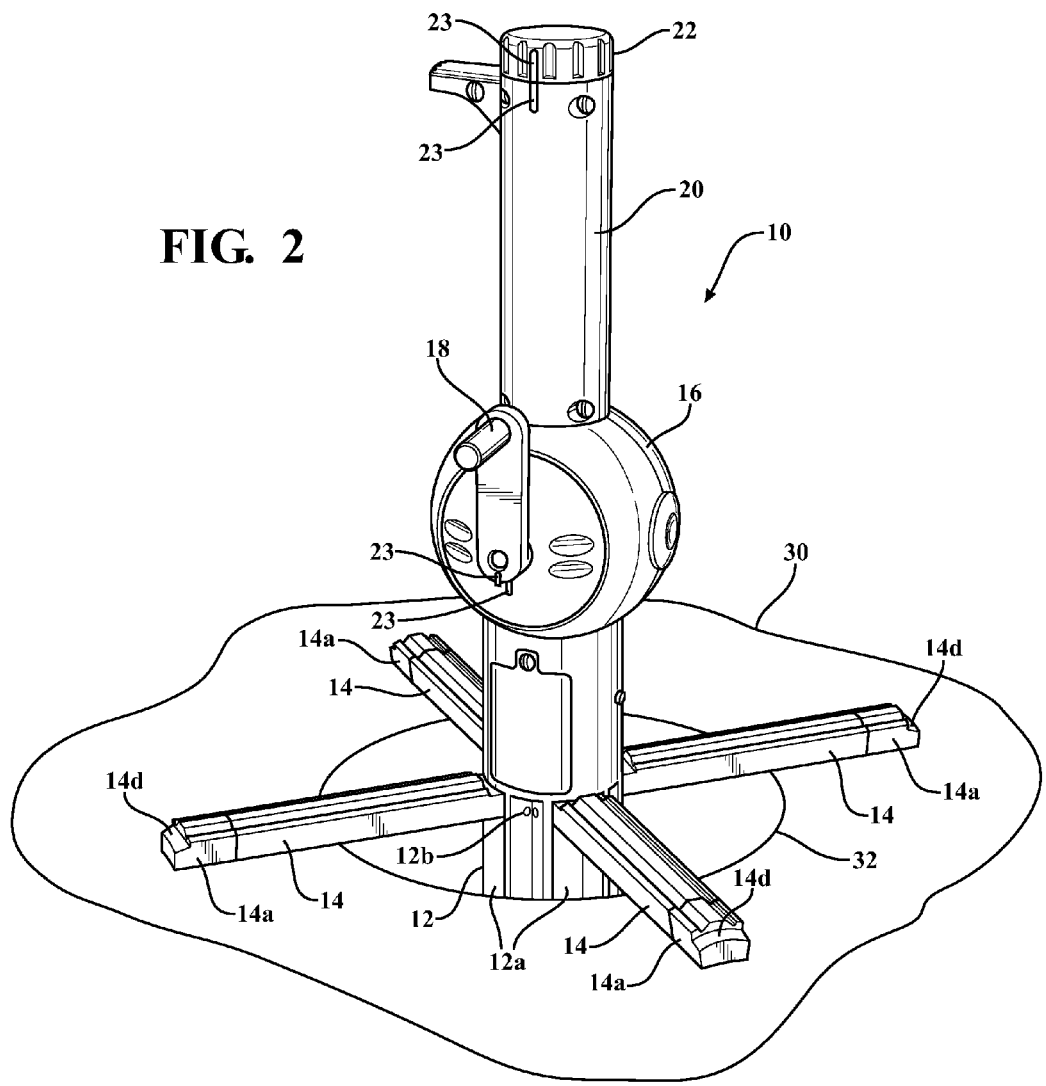
FIG. 2 is a perspective view of the rod of FIG. 1 in vertical tip-up mode over an ice fishing hole, with signal post down.

Legs 14 are normally stowed away against tube 12 as shown in FIG. 1, for example in channels 12a molded into the sides of the tube. Legs 14 can be folded or pivoted outwardly to a point generally perpendicular to tube 12, as shown in FIG. 2. In the illustrated example, legs 14 pivot on pins 12b mounted in channels 12a, and are preferably spring-biased to the deployed position of FIG. 2 by suitable springs associated with the pivot pins and operatively connected to the legs 14 (for example torsion springs 13, visible in FIG. 5). Spring-biased legs 14 may be retained in their stowed position against tube 12 by an over-center structure associated with their springs, or, as in the illustrated example, by an axially-moveable end cap 44 (see FIGS. 1, 7, and 8) that traps the outer ends 14a of the legs, for example at arcuate cap cutouts 14d matching an inner portion of end cap 44, as described in greater detail below.

Figure 3:
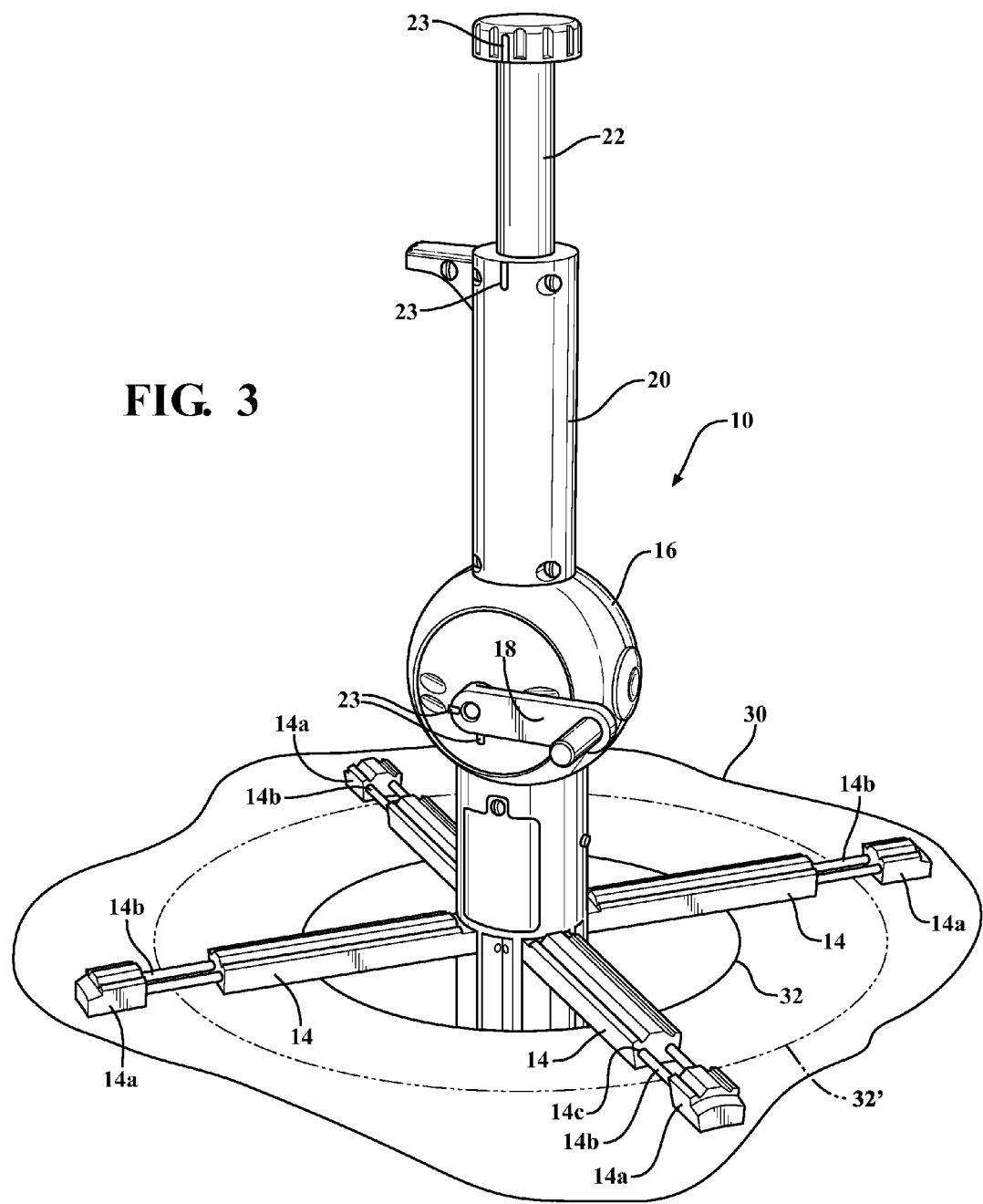
FIG. 3 is similar to FIG. 2, but with the signal post up after a fish strike, also showing leg extensions deployed.

As shown in FIG. 3, the outer ends 14a of legs 14 are extendable feet, connected to legs 14 by extension rods 14b moveable in channels 14c formed in the legs. If ice fishing hole 32 is larger than the normal span of legs 14, for example as shown in phantom at 32', feet 14a can be extended to span the larger hole and firmly engage solid ice 30.

FIGS. 2 and 3 shown flag post 22 in both the loaded (FIG. 2) and released (FIG. 3) positions. Post 22 is normally biased to the released position by a compression spring 22e (FIG. 8) secured at its lower end to a spring seat 22f at the lower end of grip handle 20, and must be pushed down into grip 20 against the spring force to the loaded position. As further shown in FIG. 3A, reel housing contains a spool 19 for fishing line, the spool having a catch 19c configured to engage a latch 22c on the inner end of post 22 when the latch and catch are rotationally aligned by rotating post 22 and reel handle 18. Visible hash marks 23 on the post 22 and grip 20 and on the reel handle 18 and reel housing 16 are provided to indicate when the spool catch 19c and post latch 22c are aligned, at which point the post is held against spring compression until reel handle 18 is rotated to disengage the spool catch 19c from post latch 22c. A guide lug 22d on the lower end of post 22 limits the rotation of post 22 and thus helps align and protect latch 22c by engaging internal stops in the grip (not numbered, but visible in FIG. 8) if rotated too far.

Rod 10 is shown being used in the classic tip-up mode in FIGS. 2-3, in which the rod is positioned vertically over hole 32 with all of the legs 14 (at least three, four illustrated) deployed perpendicularly to the rod tube 12, and with post 22 loaded inside grip 20 under spring tension. As is known, a length of fishing line fed from spool 19 in reel housing 16 is lowered down through the hole 32 to a desired depth to position a baited hook or lure. When a fish takes the hook and pulls, line is fed from the spool, rotating reel handle 18, unlatching the internal catch-and-latch structure, and releasing flag post 22 upwardly to a visible "strike" position. Post 22 may be colored brightly or provided with internal battery-powered illumination for greater visibility.

While legs 14 are shown in a preferred 90-degree deployment relative to rod tube 12 in the illustrated example, it would also be possible to limit their deployment to various less-than-perpendicular acute deployment angles, for example 45-degrees. Legs 14 are positively stopped at their inner, pivoting ends by a shoulder on the rod tube at the deployment angle to brace the rod and to prevent it from going through the hole in the ice.

Rod 10 may be used without rod tip 24 in the vertical tip-up mode of FIGS. 2-3. However, it is preferred that rod tip 24 be secured to the outer end of tube 12 when rod 10 is used in the vertical tip-up mode, with the rod tip extending down through the ice fishing hole into the water, to allow a fisherman to pull rod 10 out of the hole after a fish strike and reel the fish in using reel handle 18, like a regular jigging rod.

Figure 4:
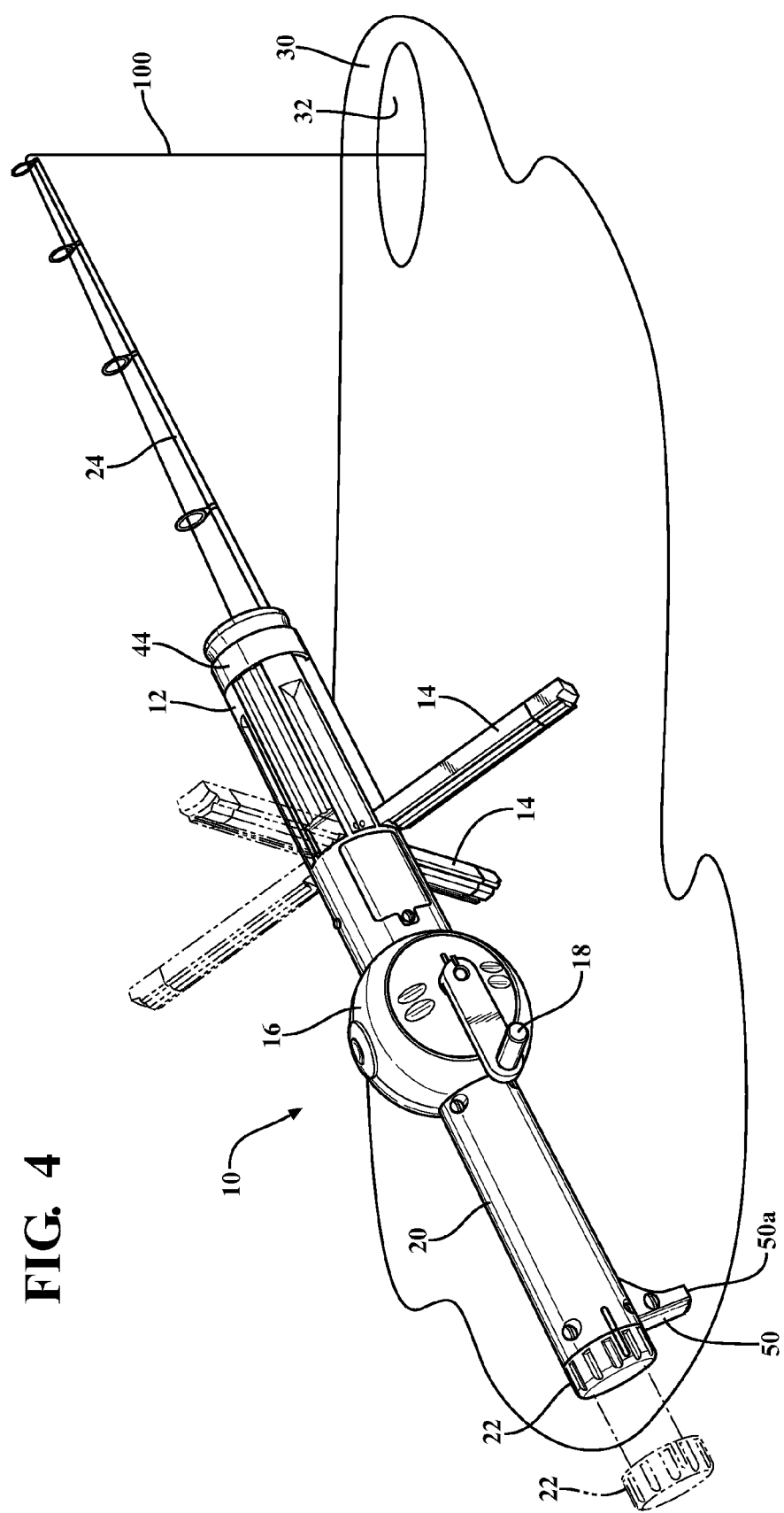
FIG. 4 is a perspective rear view of the rod of FIG. 1 in a hybrid tip-up fishing mode, supported on two legs at an acute angle above the ice.
Figure 5:
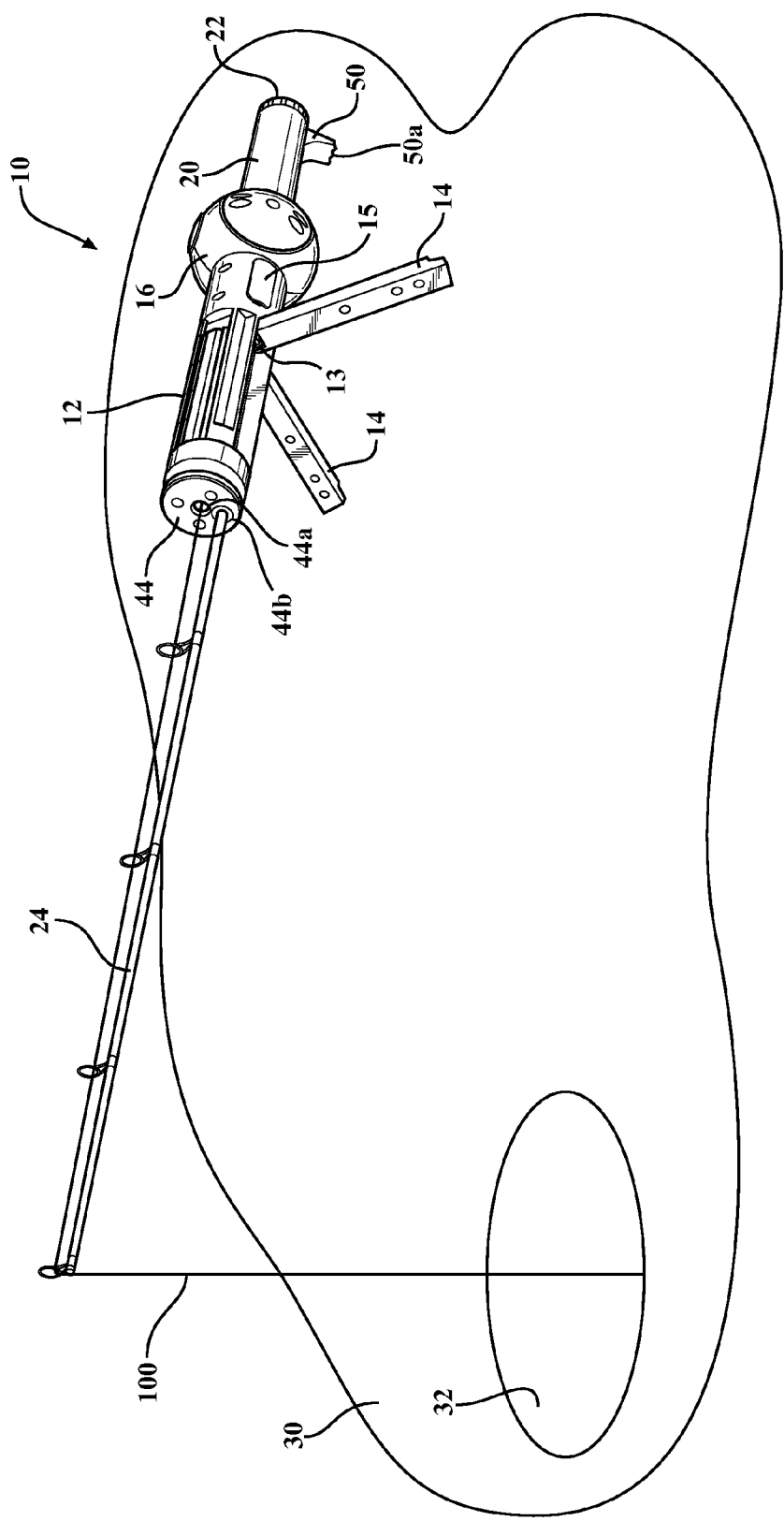
FIG. 5 is a perspective front view of the rod of FIG. 1 in hybrid tip-up mode.

Referring next to FIGS. 4 and 5, rod 10 is shown in a hybrid tip-up/jigging mode, in which two adjacent legs 14 are deployed to form a bipod supporting rod tip 24, tube 12, and reel housing 16 above the ice with sufficient clearance for reel handle 18 to rotate freely if a fish takes the line. To ensure that flag post 22 also has clearance to pop out from the end of grip 20 when a fish strikes, the grip may be provided with a foot 50 positioned to hold the end of the grip above the ice, as well. Foot 50 may be provided with teeth or prongs 50a to help anchor it to the ice, and may be curved or hooked toward the reel housing 16 to help secure the grip handle in a fisherman's hand.

As best shown in FIG. 5, end cap 44 on the outer end of tube 12 includes a line guide bore 44a for feeding and retrieving fishing line 100 from the spool in reel housing 16 through the hollow tube 12. End cap 44 also includes at least one rod tip socket 44b providing a removable connection for the end of rod tip 24, for example a snug friction fit as is known for use in sectional fishing rods. Multiple rod tip sockets 44b may be provided to adjust the position of the rod tip relative to the fishing line and rod 10, or to hold extra rod tips available for quick change-outs.

FIG. 5 also shows a hook cleat 15 on the side of the rod tube 12, below reel housing 16, comprising a raised, oval cleat with a radius at the ends suitable for clipping the bight of a fish hook. Cleat 15 optionally has enough height to allow loose fishing line to be wrapped around the base of the cleat.

Figure 6:
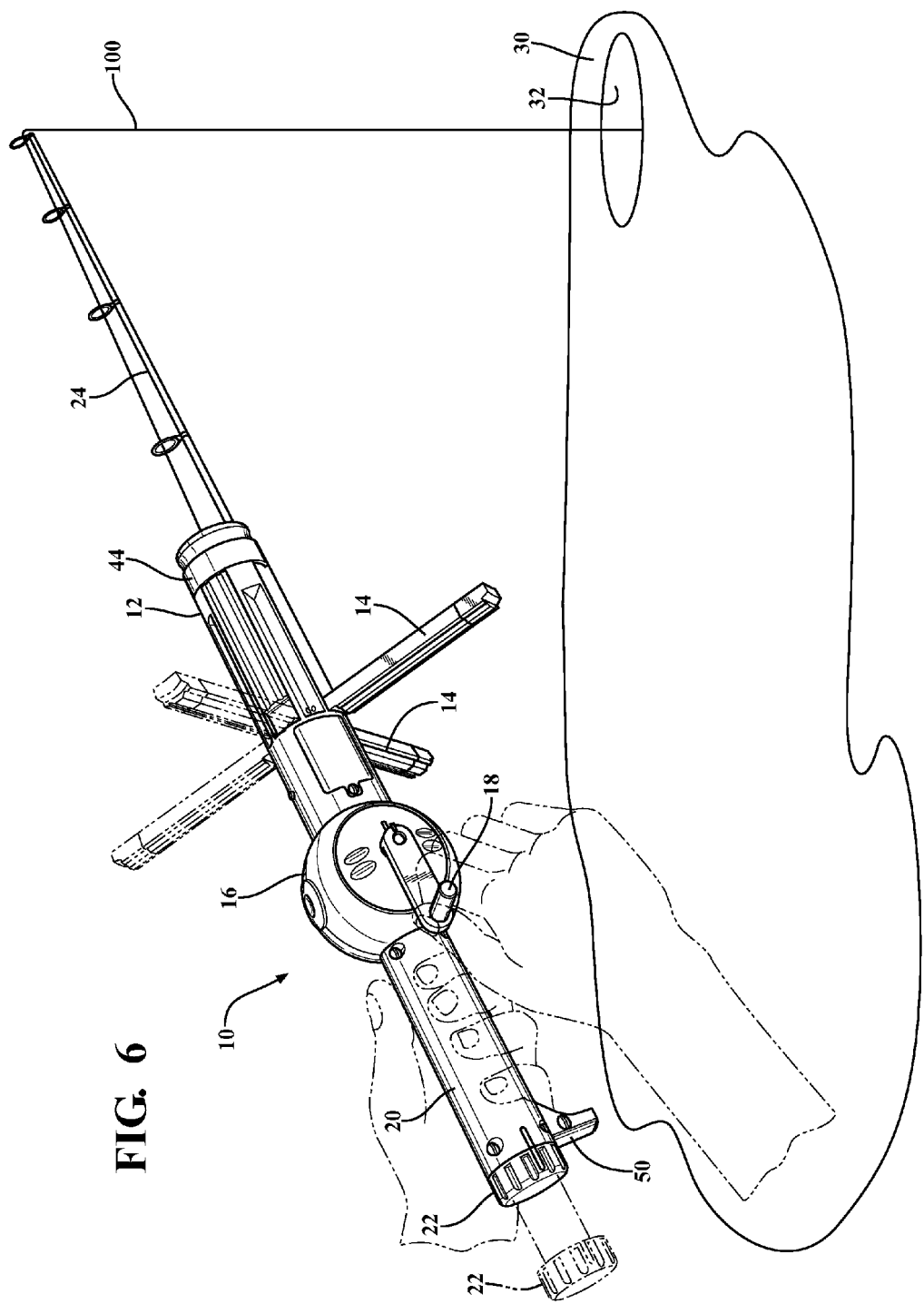
FIG. 6 is a perspective view of the rod of FIG. 1 in hand-held jigging mode.

Referring to FIG. 6, rod 10 is shown being used as a jigging rod, held by a fisherman above the ice. Rod 10 may be used exclusively in jigging mode above the ice hole, or may be picked up by the fisherman from either the classic vertical or hybrid angled tip-up modes shown in FIGS. 1-6 after a fish strike has triggered flag post 22. FIG. 6 shows both, with the option of two or four legs 14 radially deployed from tube 12. It should also be understood that legs 14 may be deployed even if the rod is used only for jigging, in order to prevent rod 10 from being dropped or dragged through the ice hole 32.

Figure 7:
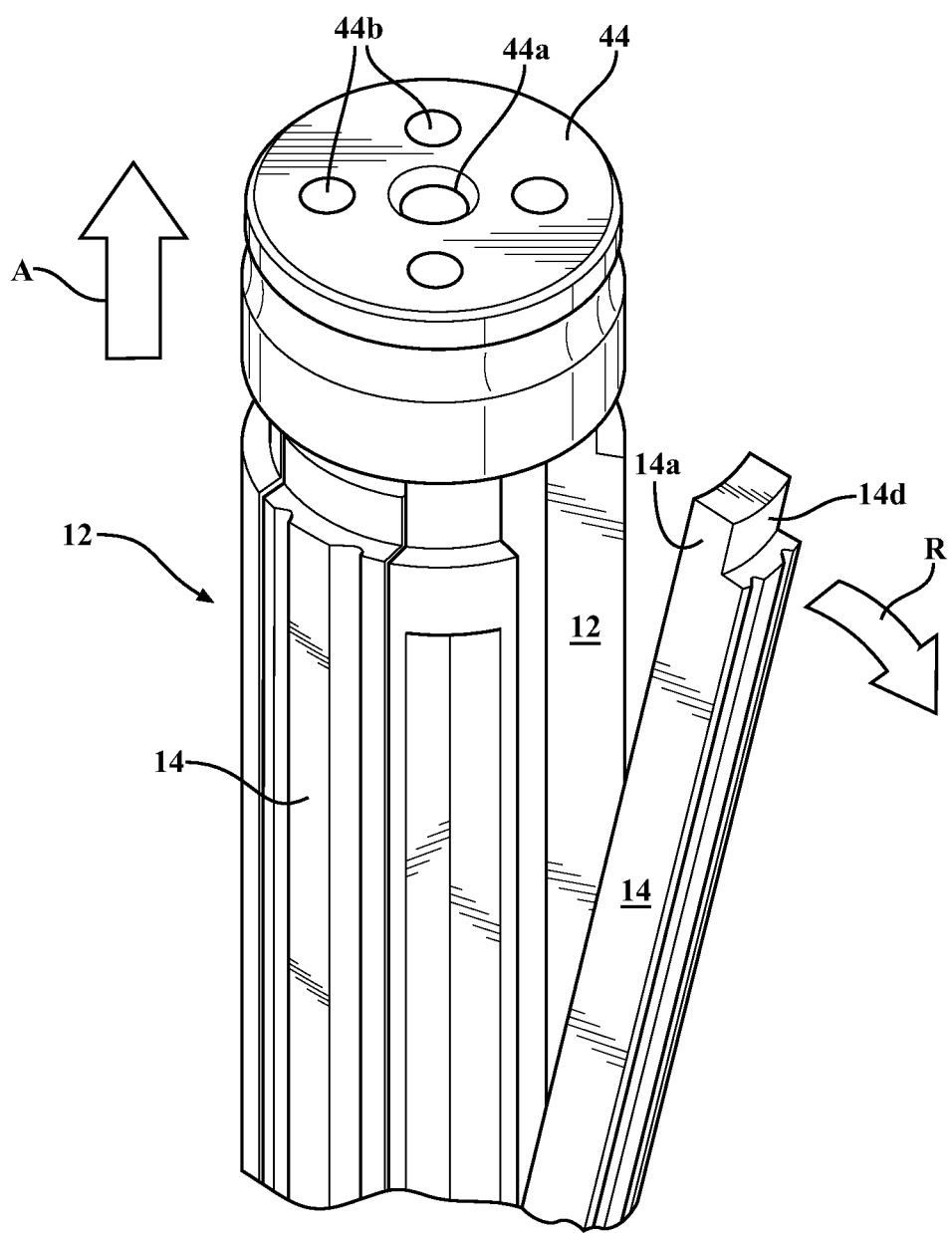
FIG. 7 detailed perspective front end view of the end collar pulled away, and a leg pivoting out.

FIG. 7 shows the leg-securing end cap 44 in greater detail, with three legs 14 secured against tube 12, and one leg 14 deploying radially after cap 44 has been pulled outwardly to disengage it from the arcuate cutout 14d on the end of the leg. When cap 44 is returned (or, if spring-biased, released) back into full engagement with cutouts 14d, the legs 14 are radially locked to tube 12. Accordingly, for spring-biased legs, pulling cap 44 away from tube 12 in the direction of arrow A allows legs 14 to spring open radially in the direction of arrow R. Cap 44 may be configured to be pulled out in direction A farther than necessary to clear the ends 14a of legs 14, in order to provide extra closing clearance if the ends of the legs are iced up.

Figure 8:
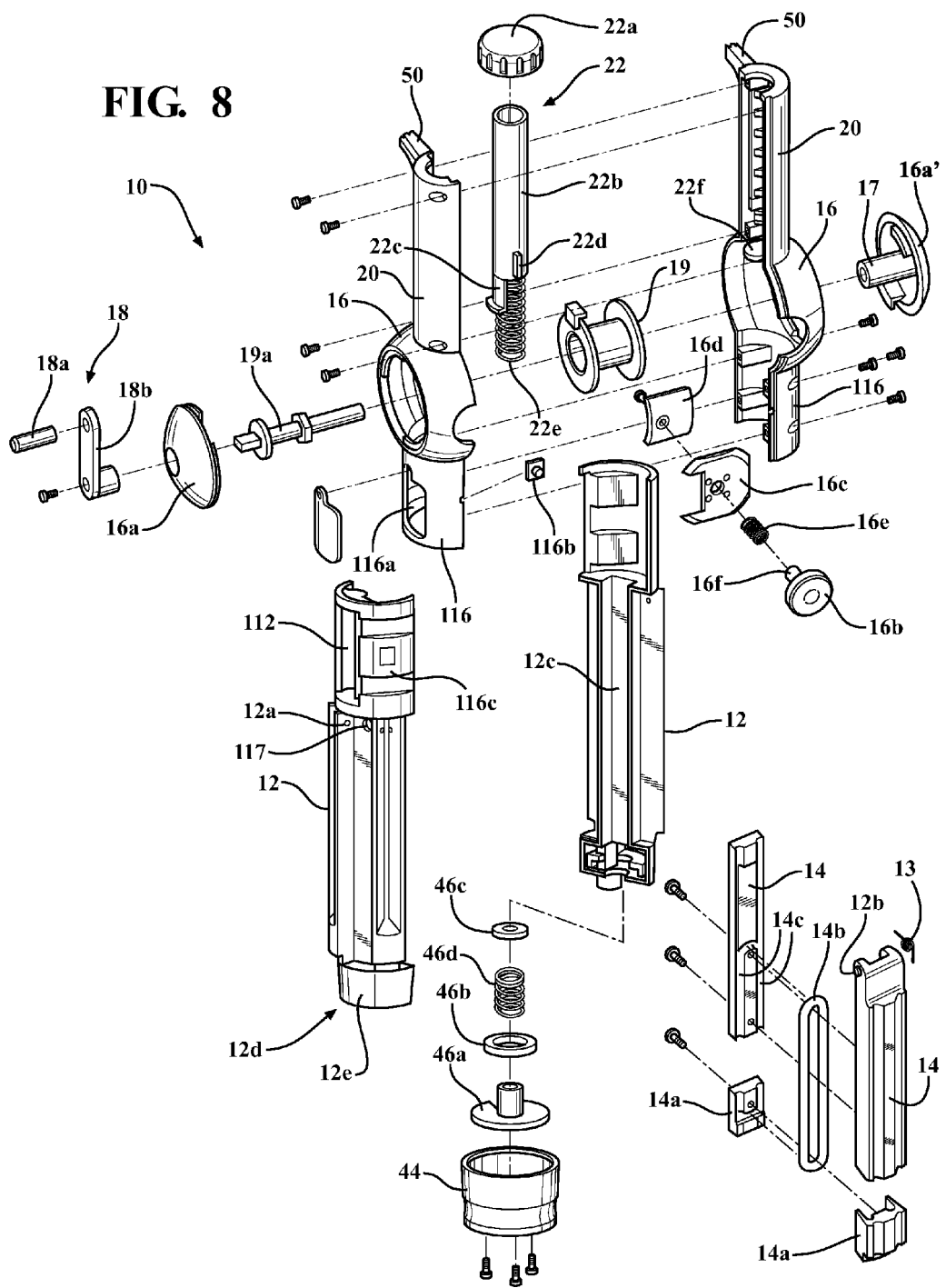
FIG. 8 is a perspective exploded assembly view of the rod of FIG. 1.

FIG. 8 is an exploded view of rod 10 showing the various parts of the assembled rod. In the illustrated example, flag post 22 includes a knurled twist knob 22a secured to a tube 22b having latch 22c formed in its lower end. Grip 20, foot 50, reel housing 16, and a tubular base portion 116 of reel housing 16 forming a socket for tube 12 (and defining an optional battery compartment access opening 116a with a cover 116c for a battery/UV light compartment 112) are formed as two radially mating halves. Reel handle 18 includes a crank handle 18a, and a reel crank 18b extending through a first reel housing cover plate 16a; a second reel housing cover plate 16a' without an external opening for reel handle 18 is located on the opposite side of reel housing 16, and is swappable with cover plate 16a in order to mount reel handle 18 on either side of the rod. Closed cover plate 16a' includes a hollow bearing stem 17 for receiving a spool axle 19a that operatively connects the reel handle 18 to spool 19.

Reel housing 16 may include a mechanism for applying drag to spool 19 to control the play of fishing line. In the illustrated example, a drag mechanism includes a drag button 16b, a drag bracket 16c, and a drag clutch 16d. Button 16b is mounted to move vertically on bracket 16c via a center post 16f and four alignment pins (not visible) sliding through corresponding holes in bracket 16c, which in turn secures the button to the reel housing. A spring 16e trapped between button 16b and bracket 16c on the button's center post biases the button 16c away from the bracket. The center post 16f on button 16c is coupled at its inner end to clutch 16d, whose curved inner face the center post presses into frictional engagement with the face of the spool 19 with varying force by pressing button 16b downwardly against the force of the spring, depending on whether and how far the button 16b is depressed.

Rod tube 12 is also shown formed as mating halves, with an axial bore 12c for fishing line 100. The outer end 12d of tube 12 includes a truncated conical base 12e (FIG. 8) on which end cap 44 can move axially. End cap 44 is secured to a leg clasp inner disc 46a, which in turn is secured to one end of tension spring 46d by a leg clasp bracket 46b. A tension spring cap 46c secures the other end of tension spring 46d to tube 12 by being trapped in a circular slot (unnumbered but shown in FIG. 8) in the end of the tube. Spring 46d normally pulls cap 44 inwardly over base 12e to lock the legs 14 in their channels 12a on tube 12. The various portions of the end cap assembly include aligned central openings or bores to provide passage for fishing line 100.

Figure 3A:
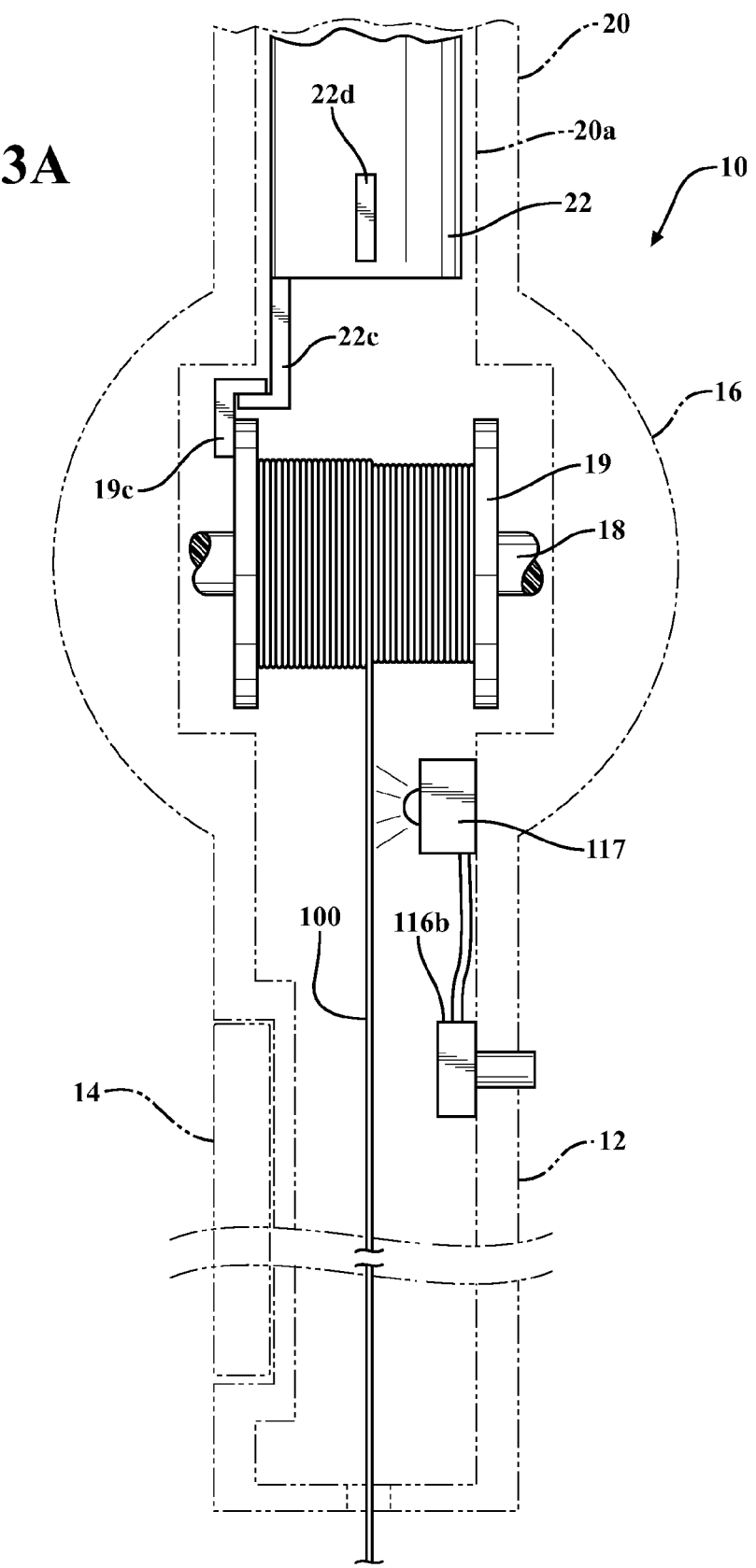
FIG. 3A is a detail side elevation cutaway view of the reel housing and its internal post-latching mechanism in the condition of FIG. 2, with the signal post latched down, and of a portion of the rod tube with a line-warming UV light shown schematically.

Referring now to FIGS. 3A and 8, an optional UV line-warming light 117 is shown schematically in a hollow, submersible, flooded upper end of tube 12 below the battery compartment 112, located adjacent the pivot connection of legs 14 to tube 12. Light 117 is a UV light emitter of known type, for example a UV-emitting LED, electrically connected to and powered by one or more batteries (not shown) of known type operatively stored in compartment 112, and operated by an external switch 116b through known control circuitry 116c in or adjacent the battery compartment 112. UV light 117 is located in an upper end of tube 12 adjacent the fishing line bore 12c, so that the light it emits is directed upon the fishing line 100 passing through the tube. Since the interior of tube 12 is open to the water in the ice fishing hole via end cap line opening 44a, the tube fills with water when used in vertical tip-up mode. The waterline in the ice fishing hole tends to rise to a point at or near the upper surface of the ice 30, adjacent the plane of radially extended legs 14, so the location of the UV light at or near legs 14 in compartment 112 places the UV-illuminated part of the fishing line 100 at or near the waterline. The UV light 117 accordingly warms the fishing line sufficiently at the waterline to prevent the fishing line from freezing into the skin of ice that tends to form at the waterline. The power of UV light 117 can be selected to warm both the fishing line and the surface of the water in tube 12, if desired.

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A combination tip-up and jigging rod for ice fishing, comprising:
   a rod tube having a longitudinal axis and including an enclosed interior longitudinal passage for fishing line and a fishing line opening at an outer end thereof;
   a hollow grip handle coaxially aligned with the rod tube;
   a spring-loaded signal post in the grip handle, the signal post movable axially in the handle along the longitudinal axis between a retracted position substantially contained in the handle under a compressive spring force and a released position with a substantial portion extended longitudinally and visibly from the handle;
   a reel housing located between and coaxially aligned with the handle and the rod tube, the reel housing including an external reel handle, an interior spool enclosed by the reel housing, and an internal signal post catch mechanism operatively associated with the spool and selectively engageable with the signal post to operatively couple the signal post to the spool in a latched condition in the retracted position under the compressive spring force;
   a rod tip removably mounted to the outer end of the rod tube and extending longitudinally therefrom; and,
   three or more circumferentially evenly spaced legs on an exterior of the rod tube, the legs independently moveable relative to the rod tube between a stowed position stored substantially parallel to the rod tube and a radially extended position at an angle up to perpendicular relative to the rod tube, the legs in the radially extended position extending from a common location on the rod tube between the reel housing and the outer end of the rod tube and defining a horizontal support plane around the rod tube generally perpendicular to the longitudinal axis of the rod tube for resting on ice or snow around an ice fishing hole when the rod is positioned vertically over an the ice fishing hole such that a portion of the rod tube extends below the horizontal support plane defined by the radially extended legs and into the ice fishing hole.

2. The combination tip-up and jigging rod of claim 1, wherein the internal signal post catch mechanism is rotatable with the spool and not visible outside the reel housing, and wherein the signal post includes an internal latch at an inner end thereof selectively rotationally engageable with the internal signal post catch mechanism on the spool by rotating the signal post and the spool into suitable alignment to engage the internal signal post catch mechanism and the internal latch inside the reel housing.

3. The combination tip-up and jigging rod of claim 2, further including a first set of external hash marks on an outer end of the signal post and the grip handle and a second set of external hash marks on the reel handle and the reel housing, wherein when the first set of hash marks are rotationally aligned and the second set of hash marks are rotationally aligned, the internal latch and the internal signal post catch mechanism are rotationally aligned.

4. The combination tip-up and jigging rod of claim 1, wherein the legs are each independently spring-biased to their respective radially extended positions.

5. The combination tip-up and jigging rod of claim 4, wherein the rod tube is hollow and the legs are radially secured to the rod tube by an axially moveable end cap connected to and forming a closure for an outermost end of the rod tube and coaxial with the rod tube and engageable with outermost ends of the legs in their stowed position, the end cap further defining the outer end of the rod tube and including the fishing line opening.

6. The combination tip-up and jigging rod of claim 1, wherein each of the legs includes a radially extendable outer end.

7. The combination tip-up and jigging rod of claim 1, wherein the outer end of the rod tube includes a rod tip socket in the outer end of the rod tube for securing the rod tip, the rod tip socket radially spaced from the fishing line opening.

8. The combination tip-up and jigging rod of claim 1, wherein the reel housing fully encloses the spool and the fishing line from the spool exits the rod from the fishing line opening at an outer end of the enclosed interior longitudinal passage of the rod tube from the fishing line opening at a distance spaced longitudinally from the reel housing below the legs while remaining enclosed by the rod tube between the reel and the fishing line opening.

9. The combination tip-up and jigging rod of claim 1, wherein the grip handle includes a radially extending foot located on a line bisecting an adjacent two of the legs, the foot configured to rest on and space the grip from ice a sufficient distance to permit the signal post to extend freely from the grip when the adjacent two of the legs are used as a bipod on ice.

10. The combination tip-up and jigging rod of claim 1, wherein the rod tube includes a submersible flooded chamber in fluid communication with an exterior of the rod tube, the fishing line extending through the submersible flooded chamber, the submersible flooded chamber including a UV light directed at the fishing line in the submersible flooded chamber to warm the fishing line.

11. The combination tip-up and jigging rod of claim 1, wherein the grip, the rod tube, and the rod tip are longitudinally aligned with one another.

12. The combination tip-up and jigging rod of claim 1, wherein the reel is spaced from the common location from which the legs radially extend, such that the reel is spaced above the horizontal support plane when the legs are radially extended and the rod is positioned vertically over the ice fishing hole.

13. A combination tip-up and jigging rod for ice fishing, comprising:
  a rod tube having a longitudinal axis and including an enclosed interior longitudinal passage for fishing line and a fishing line opening at an outer end thereof;
  a hollow grip handle coaxially aligned with the rod tube;
  a spring-loaded signal post in the grip handle, the signal post movable axially in the handle between a retracted position substantially contained in the handle under a compressive spring force and a released position with a substantial portion extended longitudinally and visibly from the handle;
  a reel housing located between and coaxially aligned with the handle and the rod tube, the reel housing including an external reel handle, an interior spool enclosed by the reel housing, and an internal signal post catch mechanism operatively associated with the spool and selectively engageable with the signal post to operatively couple the signal post to the spool in a latched condition in the retracted position under the compressive spring force;
  a rod tip removably mounted to the outer end of the rod tube and extending longitudinally therefrom; and,
  three or more circumferentially evenly spaced legs on an exterior of the rod tube, the legs independently moveable relative to the rod tube between a stowed position stored substantially parallel to the rod tube and a radially extended position at an angle up to perpendicular relative to the rod tube, the legs in the radially extended position extending from a common location on the rod tube between the reel housing and the outer end of the rod tube and defining a support plane perpendicular to the longitudinal axis of the rod tube, wherein the catch mechanism is rotatable with the spool and not visible outside the reel housing, and wherein the signal post includes an internal latch at an inner end thereof selectively rotationally engageable with the internal signal post catch mechanism on the spool by rotating the signal post and the spool into suitable alignment to engage the internal signal post catch mechanism and the internal latch inside the reel housing.

14. The combination tip-up and jigging rod of claim 13, further including a first set of external hash marks on an outer end of the signal post and the grip handle and a second set of external hash marks on the reel handle and the reel housing, wherein when the first set of hash marks are rotationally aligned and the second set of hash marks are rotationally aligned, the internal latch and the internal signal post catch mechanism are rotationally aligned.

* * * * *